US00RE47482E

(19) United States
(12) Reissued Patent
Nieuwland et al.

(10) Patent Number: US RE47,482 E
(45) Date of Reissued Patent: Jul. 2, 2019

(54) SYSTEM AND METHOD FOR VERIFYING WHETHER A VEHICLE IS EQUIPPED WITH A FUNCTIONAL ON-BOARD UNIT

(71) Applicant: TELIT AUTOMOTIVE SOLUTIONS NV, Leuven (BE)

(72) Inventors: Andre Krijn Nieuwland, Waalre (NL); Gerardo Daalderop, Best (NL)

(73) Assignee: TELIT AUTOMOTIVE SOLUTIONS NV, Leuven (BE)

(21) Appl. No.: 14/925,055

(22) Filed: Oct. 28, 2015

Related U.S. Patent Documents

Reissue of:
(64) Patent No.: 8,570,164
Issued: Oct. 29, 2013
Appl. No.: 13/366,852
Filed: Feb. 6, 2012

(51) Int. Cl.
*B60Q 1/00* (2006.01)
*G07B 15/06* (2011.01)
*G08G 1/017* (2006.01)
*G06Q 30/02* (2012.01)

(52) U.S. Cl.
CPC ..... *G07B 15/063* (2013.01); *G08G 1/0175* (2013.01); *G06Q 30/0284* (2013.01)

(58) Field of Classification Search
CPC ..... G07B 15/063; G08G 1/0175; G06Q 30/0284
USPC ..... 340/425.5, 10.1, 5.8, 988; 705/13; 235/375
See application file for complete search history.

(56) References Cited

U.S. PATENT DOCUMENTS 6,140,941 A * 10/2000 Dwyer ..... G07B 15/063 235/384
6,868,313 B2 3/2005 Koljonen
7,161,563 B2 1/2007 Vitale et al.
7,385,525 B2 * 6/2008 Ho ..... G07B 15/063 340/928
7,705,750 B2 * 4/2010 Holmberg ..... G07B 15/063 340/928

(Continued)

FOREIGN PATENT DOCUMENTS

CN 1828686 9/2006
CN 1932920 3/2007

(Continued)

*Primary Examiner* — Linh M Nguyen
(74) *Attorney, Agent, or Firm* — Pearl Cohen Zedek Latzer Baratz LLP

(57) ABSTRACT

Various exemplary embodiments relate to a verification system and method for verifying whether a vehicle is equipped with a functional on-board unit (OBU). The system may include a license plate recognition system configured to obtain a license plate number of the vehicle at a first location; a database of license plate numbers and OBU information; a wireless communication system configured to send a trigger message to the OBU using the OBU information, and configured to receive a response from the OBU indicating a location of the OBU; and a verification module configured to determine whether the vehicle is equipped with the OBU. The database may include a correspondence of license plate numbers and OBU information. The verification module may determine that the vehicle is equipped with the OBU if the location reported by the OBU is within a specified distance of the first location.

20 Claims, 4 Drawing Sheets

(56) References Cited

U.S. PATENT DOCUMENTS

| | | | | |
|---|---|---|---|---|
| 7,774,228 | B2 * | 8/2010 | Robinson | G06Q 10/02 340/5.2 |
| 9,015,497 | B2 * | 4/2015 | Peeters | G06F 21/552 713/190 |
| 9,269,197 | B2 * | 2/2016 | Van Haperen | G07B 15/063 |
| 2002/0084889 | A1 * | 7/2002 | Bolavage et al. | 340/10.1 |
| 2005/0197976 | A1 * | 9/2005 | Tuton et al. | 705/417 |
| 2006/0063563 | A1 * | 3/2006 | Kaufman | H04M 1/663 455/556.2 |
| 2006/0258367 | A1 | 11/2006 | Chiang | |
| 2006/0278705 | A1 * | 12/2006 | Hedley | G07B 15/063 235/384 |
| 2008/0068180 | A1 * | 3/2008 | Powell et al. | 340/425.5 |
| 2009/0016819 | A1 * | 1/2009 | Vu | G07B 15/063 404/84.05 |
| 2013/0018705 | A1 * | 1/2013 | Heath et al. | 705/13 |
| 2013/0124306 | A1 * | 5/2013 | Hutchinson | G06Q 30/02 705/14.47 |
| 2013/0170711 | A1 * | 7/2013 | Chigos et al. | 382/105 |

FOREIGN PATENT DOCUMENTS

| | | | | |
|---|---|---|---|---|
| CN | 101251954 | | 8/2008 | |
| CN | 101350109 | | 1/2009 | |
| CN | 201207221 | | 3/2009 | |
| CN | 201226156 | | 4/2009 | |
| EP | 1 088 286 | | 4/2001 | |
| EP | 1 200 938 | | 5/2002 | |
| EP | 1 519 322 | | 3/2005 | |
| EP | 1 783 692 | | 5/2007 | |
| EP | 1 860 615 | | 11/2007 | |
| JP | 2002-133581 | | 5/2002 | |
| JP | 2011-113508 | | 6/2011 | |
| WO | WO2011/073899 | * | 6/2011 | G07B 15/06 |

* cited by examiner

SYSTEM AND METHOD FOR VERIFYING WHETHER A VEHICLE IS EQUIPPED WITH A FUNCTIONAL ON-BOARD UNIT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

Various exemplary embodiments disclosed herein relate generally to systems and methods for the payment of tolls along toll roads.

BACKGROUND

A toll road is a road for which a vehicle pays a toll or fee for each use of the road.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of exemplary embodiments adequate to allow those of ordinary skill in the art to make and use the inventive concepts will follow in later sections.

Various exemplary embodiments relate to a verification system for verifying whether a vehicle is equipped with a functional on-board unit (OBU), including: a license plate recognition system configured to obtain a license plate number of the vehicle at a first location; a database of license plate numbers and OBU information, wherein the database includes a correspondence of license plate numbers and OBU information; a wireless communication system configured to send a trigger message to the OBU using the OBU information, and configured to receive a response from the OBU indicating a location of the OBU; and a verification module configured to determine whether the vehicle is equipped with the OBU, wherein the verification module determines that the vehicle is equipped with the OBU if the location reported by the OBU is within a specified distance of the first location.

In some embodiments, the trigger message is sent wirelessly, and the response from the OBU is received wirelessly. In some embodiments, the trigger message is at least one of a SMS message, a cellular data message, a WIFI message, and a cellular telephone call. In some embodiments, the response from the OBU is at least one of a SMS message, a WIFI message, and a cellular message. In some embodiments, the verification system issues a citation to the registered owner of the license plate if the location reported by the OBU is not within a specified distance of the first location. In some embodiments, the verification system issues a citation to the registered owner of the license plate if the license plate number obtained by the license plate recognition system does not have corresponding OBU information in the database. In some embodiments, the verification system receives a toll payment from the OBU based upon a measured location of the vehicle.

Various exemplary embodiments further relate to a method for verifying whether a vehicle is equipped with a functional on-board unit (OBU), including: obtaining a license plate number of the vehicle at a first location; obtaining OBU information that corresponds to the license plate number; sending a trigger message to the OBU using the OBU information; receiving a response from the OBU indicating a location of the OBU; and determining that the vehicle is equipped with the OBU if the location reported by the OBU is within a specified distance of the first location.

In some embodiments, the trigger message is sent wirelessly, and the response from the OBU is received wirelessly. In some embodiments, the trigger message is at least one of a SMS message, a cellular data message, a WIFI message, and a cellular telephone call. In some embodiments, the response from the OBU is at least one of a SMS message, a WIFI message, and a cellular data message. In some embodiments, the method further includes issuing a citation to the registered owner of the license plate if the location reported by the OBU is not within a specified distance of the first location. In some embodiments, the method further includes issuing a citation to the registered owner of the license plate if the OBU information cannot be obtained from the license plate number. In some embodiments, the method further includes receiving a toll payment from the OBU based upon a measured location of the vehicle.

Various exemplary embodiments further relate to a method for verifying whether a vehicle is equipped with a functional on-board unit (OBU), including: triggering the OBU to transmit a location of the OBU; updating a database with the location of the OBU, wherein the database includes a correspondence of license plate numbers and OBU information; obtaining a license plate number of the vehicle at a first location; obtaining the location of the OBU from the database by using the correspondence of license plate numbers and OBU information; and determining that the vehicle is equipped with the OBU if the location reported by the OBU is within a specified distance of the first location.

In some embodiments, the OBU is triggered when the OBU connects to a new cellular base station. In some embodiments, the OBU is triggered by at least one of a SMS message, a cellular data message, a WIFI message, and a cellular telephone call. In some embodiments, the OBU transmits the location of the OBU wirelessly. In some embodiments, the OBU transmits the location of the OBU as at least one of a SMS message, a WIFI message, and a cellular data message. In some embodiments, the method further includes issuing a citation to the registered owner of the license plate if the location reported by the OBU is not within a specified distance of the first location.

BRIEF DESCRIPTION OF THE DRAWINGS

In order to better understand various exemplary embodiments, reference is made to the accompanying drawings, wherein.

DETAILED DESCRIPTION

Figure 1:
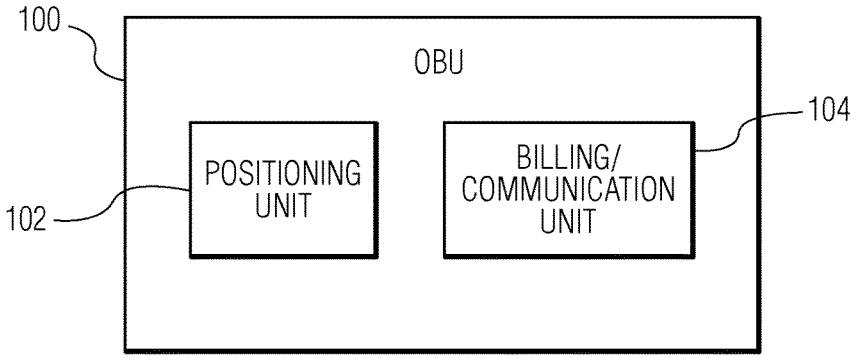
FIG. 1 illustrates an embodiment of an on-board unit (OBU)

Referring now to the drawings, in which like numerals refer to like components or steps, there are disclosed broad aspects of various exemplary embodiments.

Toll roads may utilize a variety of payment systems. A common payment system for toll roads is a toll booth. The toll booth may collect a toll from vehicles using the toll road. The toll may be collected by physically giving money to a toll booth attendant or by giving money to an automated machine at the toll booth. Alternatively, the toll may be collected electronically by wireless transceivers at the toll booth. A corresponding wireless transceiver within the vehicle may be triggered when the vehicle passes the wireless transceivers in the toll booth, and money may be deducted from an account associated with the wireless transceiver in the vehicle.

An alternative payment system for toll roads may utilize a terrestrial and/or satellite-based navigation system in lieu of, or in addition to, toll booths. The navigation system may be, for example, a Global Positioning System (GPS), or Global Navigation Satellite System (GLONASS). The navigation system may measure the location of a vehicle to determine if the vehicle is on a toll road. The navigation system may also measure the distance a vehicle travels on the toll road. An applicable toll for the vehicle may be calculated based in part upon the location and distance information from the navigation system. Other factors that may determine the applicable toll may include time and date information (e.g., time of day, day of the week, etc.) and vehicle information (e.g., vehicle weight, fuel type, speed of travel, etc.). The applicable toll may then be paid by a separate payment system. A toll road that utilizes a terrestrial and/or satellite-based navigation system may require that vehicles using the toll road are equipped with an on-board unit (OBU) that includes the systems necessary for the vehicle to determine its location and pay the applicable toll. A toll road that utilizes a terrestrial and/or satellite-based navigation system for the paying of tolls may not include toll booths. Therefore, it may be important to enforce that all vehicles using the toll road are equipped with a properly-functioning OBU, otherwise some vehicles may not pay the applicable toll.

FIG. 1 illustrates an embodiment of an OBU 100. The OBU 100 may include a positioning unit 102 and a billing/communication unit 104. The positioning unit 102 may determine a location of the OBU 100. The positioning unit 102 may utilize a terrestrial and/or satellite-based navigation system, such as, for example, GPS or GLONASS. The billing/communication unit 104 may wirelessly communicate with a payment server (not shown) to pay a vehicle's toll. The billing/communication unit 104 may utilize a wireless communication system such as, for example, Global System for Mobile Communications (GSM) or other cellular communication system.

Figure 2:
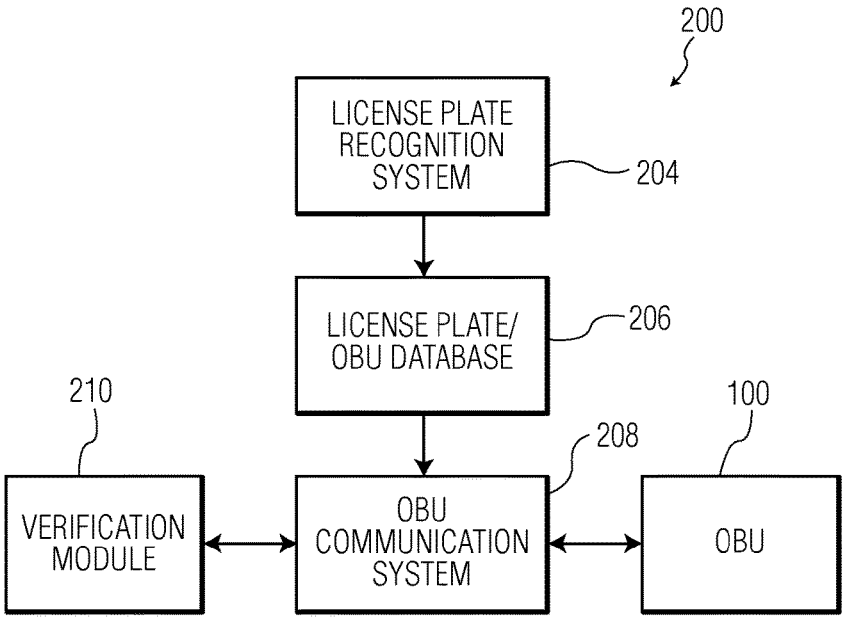
FIG. 2 illustrates an embodiment of a verification system.

FIG. 2 illustrates an embodiment of a verification system 200. The verification system 200 may verify if a vehicle is equipped with a functioning OBU 100. The verification system may include a license plate recognition system 204, a license plate/OBU database 206, and an OBU communication system 208. The license plate recognition system 204 may obtain the license plate number of a vehicle using a toll road. The license plate recognition system 204 may obtain the license plate number automatically through the use of a camera and recognition software. Alternatively, the license plate number may be manually entered into the license plate recognition system 204 by toll enforcement personnel. The license plate recognition system 204 may use the license plate number to look up OBU information in the license plate/OBU database 206. When a vehicle is equipped with an OBU 100, information about the OBU 100 may be associated with the vehicle's license plate number and stored in the license plate/OBU database 206. The license plate/OBU database 206 may include multiple, cross-referenced databases, such as a license plate/vehicle owner database and an OBU/vehicle owner database. An OBU communication system 208 may receive the OBU information that corresponds with the license plate number. The OBU information may include information necessary to contact the billing/communication unit 104 of the OBU 100, such as, for example, a GSM identification number. If the license plate/OBU database 206 does not have a record of the license plate number, or if the license plate/OBU database 206 indicates that the license plate number does not have any corresponding OBU information, then the OBU communication system 208 may issue a citation to the registered owner of the license plate and/or alert toll enforcement personnel.

The OBU communication system 208 may send a request to the OBU 100 for the OBU 100 to report its current position. The request may be received by the billing/communication unit 104 of the OBU 100. The request from the OBU communication system 208 may be in the form of a SMS message, a wireless data message (e.g., GPRS, UMTS, LTE, WIFI, etc.), or an incoming telephone call. The request from the OBU communication system 208 may include a time-stamp. The OBU 100 may respond to the request with vehicle identification information and vehicle location information. The vehicle identification information may include, for example, license plate number, vehicle identification number (VIN), vehicle brand, vehicle type, vehicle color, fuel type, pollution class, vehicle weight, vehicle size, and/or presence of hazardous materials. The vehicle location information may identify the location of the OBU 100 at a certain point in time. If the request from the OBU communication system 208 included a time-stamp, then the vehicle location information reported by the OBU 100 may correspond to a location of the vehicle at approximately the point in time of the time-stamp. If the request from the OBU communication system 208 did not include a time-stamp, then the vehicle location information reported by the OBU 100 may correspond to a location of the vehicle at approximately the point in time that the request was received. The vehicle location information may include, for example, GPS coordinates, GLONASS coordinates, latitude/longitude, a region name, and/or a road name, as well as a time and date that the location was determined. The response from the OBU 100 may be transmitted to the OBU communication system 208 using the billing/communication unit 104 of the OBU 100. The response from the OBU 100 may be transmitted in the form of a SMS message, a wireless data message (e.g., GPRS, UMTS, LTE, WIFI, etc.), or any other suitable message. The response from the OBU 100 may be encrypted and/or signed to verify the integrity of the response.

Additionally, the OBU 100 may respond to the request from the communication system 208 with additional information, such as integrity information, diagnostic information, and/or toll information. The integrity information may indicate whether any components and/or software of the OBU 100 have been tampered with. The diagnostic information may indicate whether any components and/or software of the OBU 100 are not operating correctly. The toll information may indicate the current toll mode the OBU 100 is operating under (e.g., rush hour or off-peak).

The OBU communication system 208 may transmit the response from the OBU 100 to a verification module 210. The verification module 210 may be a module of the OBU communication system 208, the license plate/OBU database 206, the license plate recognition system 204, or may be a separate, individual module. The verification module 210 may use the response from the OBU 100 to verify if the location of the OBU 100 is within a certain range of the license plate recognition system 204. The verification module 210 may also verify that the vehicle identification information from the OBU 100 matches the information in the license plate/OBU database 206. The verification module 210 may use the response from the OBU 100 to determine if the OBU 100 is present in the vehicle that was checked by the license plate recognition system 204. The OBU 100 may be assumed to be present in the vehicle if the OBU 100 reports its location as near (for example, within 100 m) to the location where the license plate recognition system 204 obtained the license plate number of the vehicle. If the verification module 210 determines that the OBU 100 is not present in the vehicle, or if the OBU communication system 208 does not receive a response from the OBU 100, then the OBU communication system 208 may record the license plate number and/or vehicle identification information, and issue a citation to the registered owner of the license plate. Alternatively or in addition, if the verification module 210 determines that the OBU 100 is not present in the vehicle, or if the OBU communication system 208 does not receive a response from the OBU 100, then the OBU communication system 208 may alert toll enforcement personnel.

Figure 3:
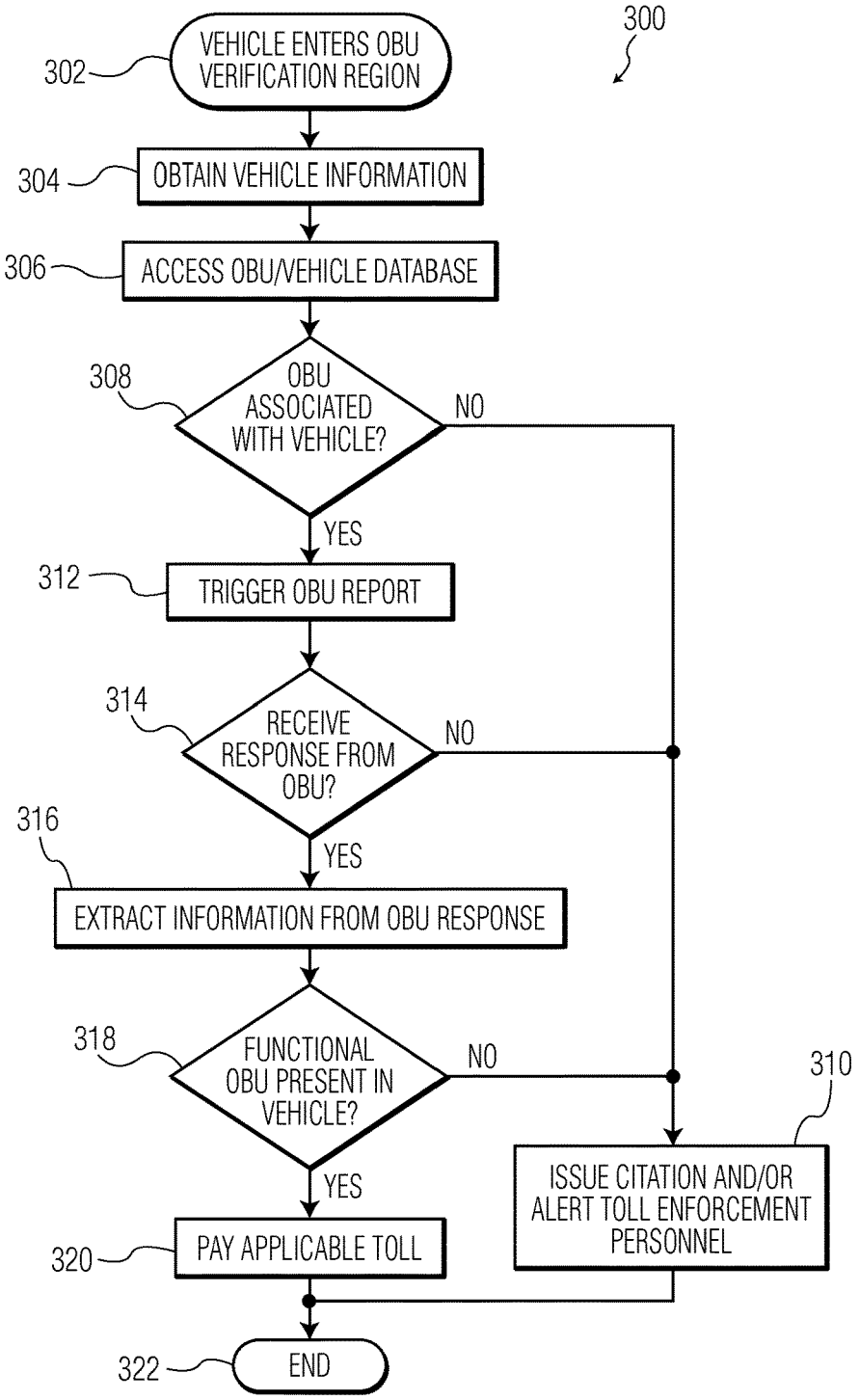
FIG. 3 illustrates an embodiment of a verification method.

FIG. 3 illustrates an embodiment of a verification method 300. The verification method 300 may begin when a vehicle enters an OBU verification region at step 302. Once in the OBU verification region, information about the vehicle such as, for example, the vehicle license plate number, may be obtained at step 304. At step 306, an OBU/vehicle database may be accessed that contains OBU information associated with vehicle information. At step 308, the verification method 300 may determine if the vehicle has an associated OBU. If the vehicle does not have an associated OBU, then the verification method 300 may issue a citation to the registered owner of the license plate and/or alert toll enforcement personnel at step 310.

If the vehicle has an associated OBU, then the verification method 300 may use the OBU information in the OBU database to send a trigger to the OBU associated with the vehicle to report its location at step 312. The OBU associated with the vehicle may be triggered by sending a message over a wireless communication network, such as, for example, a GSM network. The message may be, for example, a SMS message, a wireless data message (e.g., GPRS, UMTS, LTE, WIFI, etc.), or a cellular telephone call. At step 314, the verification method 300 may determine if the OBU associated with the vehicle sent a valid response to the trigger message. If no valid response is received from the OBU associated with the vehicle, then the verification method 300 may issue a citation and/or alert toll enforcement personnel at step 310. If a valid response is received from the OBU associated with the vehicle, then the verification method 300 may extract information from the response at step 316. The response from the OBU associated with the vehicle may include the location of the OBU at the approximate time the trigger message was received. If the trigger message included a time-stamp, then the response from the OBU associated with the vehicle may include the location of the OBU at the approximate time of the time-stamp. The response may also include other information, such as vehicle information, time and date information, and/or other enforcement information (e.g., vehicle speed, number of passengers, seatbelt status, etc.). The response from the OBU associated with the vehicle may be sent over a wireless communication network, such as, for example a GSM network. The response may be, for example, a SMS message or a wireless data message (e.g., GPRS, UMTS, LTE, WIFI, etc.).

After extracting the location information from the response of the OBU associated the vehicle, the verification method 300 may determine if the OBU is present in the vehicle and functioning properly at step 318. The verification method 300 may assume that the OBU is present in the vehicle and functioning properly if the OBU reports its location as near (for example, within 100 m) to the location where the vehicle information was obtained. If the verification method 300 determines that the OBU that sent the response is not present in the vehicle, then the verification method 300 may issue a citation and/or alert toll enforcement personnel at step 310. If the verification method 300 determines that the OBU that sent the response is present in the vehicle and functioning properly, then the OBU associated with the vehicle may pay an applicable toll at step 320. The applicable toll may be paid immediately upon calculation by the OBU, or may be paid at a later time. The verification method 300 ends at step 322.

Figure 4:
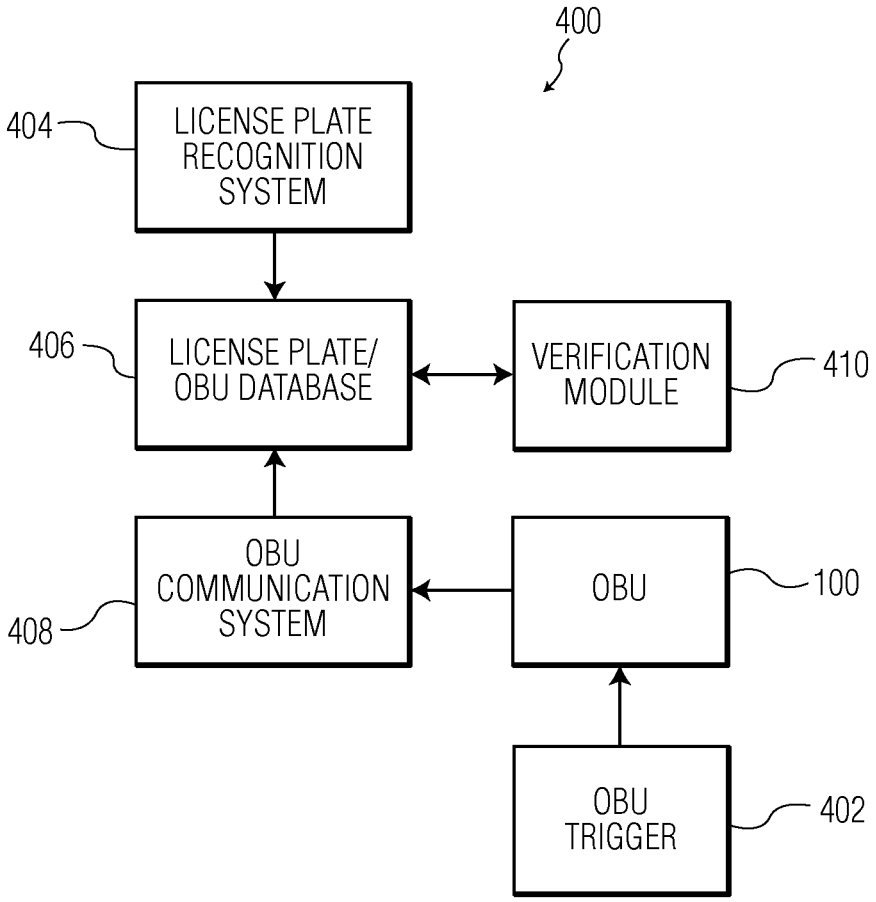
FIG. 4 illustrates an alternative embodiment of a verification system.

FIG. 4 illustrates an alternative embodiment of a verification system 400. The verification system 400 may verify if a vehicle is equipped with a functioning OBU 100. The verification system may include an OBU trigger 402, a license plate recognition system 404, a license plate/OBU database 406, and an OBU communication system 408. The OBU trigger 402 may trigger the OBU 100 to report its current position. The OBU trigger 402 may be a wireless checkpoint, such as, for example a cellular base station or a toll booth. The trigger from the OBU trigger 402 may be received by the billing/communication unit 104 of the OBU 100. The trigger from the OBU trigger 402 may be in the form of a SMS message, a wireless data message (e.g., GPRS, UMTS, LTE, WIFI, etc.), an incoming telephone call, or other wireless signals (e.g., infrared, radio-frequency, etc.). The trigger from the OBU trigger 402 may include a time-stamp. Alternatively, the OBU 100 may be triggered to report its position whenever the billing/communication unit 104 connects to a new cellular base station. The OBU 100 may respond to the trigger with vehicle identification information and vehicle location information. The vehicle identification information may include, for example, license plate number, vehicle identification number (VIN), vehicle brand, vehicle type, vehicle color, fuel type, pollution class, vehicle weight, vehicle size, and/or presence of hazardous materials. The vehicle location information may identify the location of the OBU 100 at a certain point in time. If the trigger from the OBU trigger 402 included a time-stamp, then the vehicle location information reported by the OBU 100 may correspond to a location of the vehicle at approximately the point in time of the time-stamp. If the trigger from the OBU trigger 402 did not include a time-stamp, then the vehicle location information reported by the OBU 100 may correspond to a location of the vehicle at approximately the point in time that the trigger was received. The vehicle location information may include, for example, GPS coordinates, GLONASS coordinates, latitude/longitude, a region name, and/or a road name, as well as a time and date that the location was determined. The response from the OBU 100 may be transmitted to the OBU communication system 408 using the billing/communication unit 104 of the OBU 100. The response from the OBU 100 may be transmitted in the form of a SMS message, a wireless data message (e.g., GPRS, UMTS, LTE, WIFI, etc.), or any other suitable message. The response from the OBU 100 may be encrypted and/or signed to verify the integrity of the response.

Additionally, the OBU may respond to the trigger with additional information, such as integrity information, diagnostic information, and/or toll information. The integrity information may indicate whether any components and/or software of the OBU 100 have been tampered with. The diagnostic information may indicate whether any components and/or software of the OBU 100 are not operating correctly. The toll information may indicate the current toll mode the OBU 100 is operating under (e.g., rush hour or off-peak).

The OBU communication system 408 may use the response from the OBU 100 to update the license plate/OBU database 406. When a vehicle is equipped with an OBU 100, information about the OBU 100 may be associated with the vehicle's license plate number and stored in the license plate/OBU database 406. The license plate/OBU database 406 may include multiple, cross-referenced databases, such as a license plate/vehicle owner database and an OBU/vehicle owner database. The license plate/OBU database 406 may be updated to indicate the license plate numbers associated with the OBUs triggered by the OBU trigger 402. In this way, the license plate/OBU database 406 may indicate the license plate numbers for vehicles that are known to be in a desired geographic region.

The license plate recognition system 404 may obtain the license plate number of a vehicle using a toll road. The license plate recognition system 404 may obtain the license plate number automatically through the use of a camera and recognition software. The license plate/OBU database 406 may aid the recognition software in obtaining the license plate number by indicating the license plate numbers of vehicles that are known to be in the region (for example, within 100 m) of the license plate recognition system 404. In this way, the license plate recognition system 404 may predict which license plate numbers are likely to be in the camera's view. Alternatively, the license plate number may be manually entered into the license plate recognition system 404 by toll enforcement personnel.

The license plate recognition system 404 may transmit the license plate number to a verification module 410. The verification module 410 may be a module of the OBU communication system 408, the license plate/OBU database 406, the license plate recognition system 404, or may be a separate, individual module. The verification module 410 may use the license plate number to look up OBU information in the license plate/OBU database 406. The verification module 410 may use the license plate number and OBU information to verify if the vehicle is equipped with a functioning OBU 100. If the license plate number indicates that the vehicle was already known to be in the region of the license plate recognition system 404, then the verification module 410 may assume that the vehicle is equipped with a functioning OBU 100. If the license plate/OBU database 406 does not have a record of the license plate number, or if the license plate/OBU database 406 indicates that the license plate number associated with the OBU 100 is not in the region of the license plate recognition system 404, then the verification module 410 may issue a citation to the registered owner of the license plate and/or alert toll enforcement personnel. If toll enforcement personnel are alerted, the OBU 100 may be configured to periodically transmit position updates to aid the toll enforcement personnel in locating the vehicle.

Figure 5:
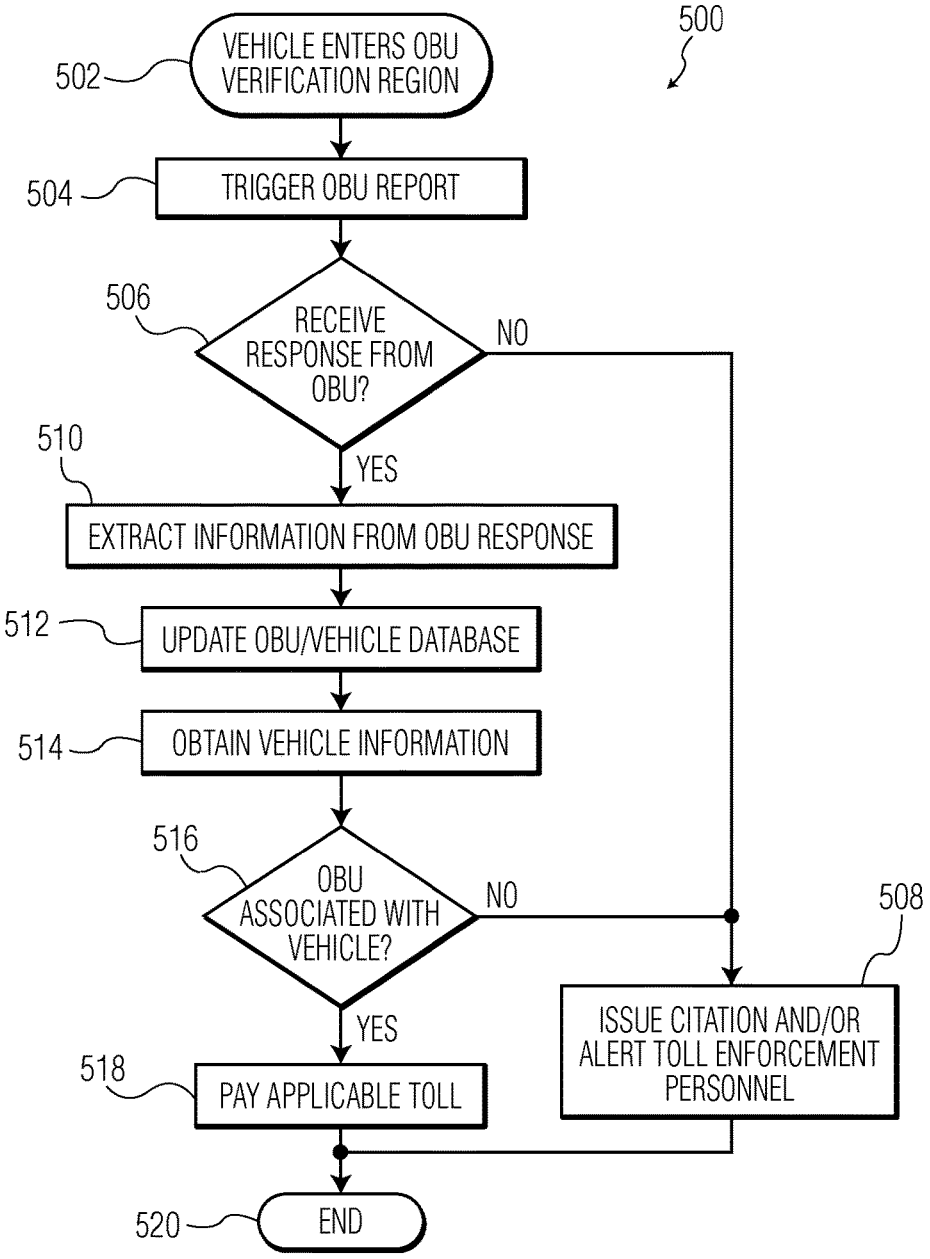
FIG. 5 illustrates an alternative embodiment of a verification method.

FIG. 5 illustrates an alternative embodiment of a verification method 500. The verification method 500 may begin when a vehicle enters an OBU verification region at step 502. Once in the OBU verification region, an OBU associated with the vehicle may be triggered to report its location at step 504. At step 506, the verification method 500 may determine if the OBU associated with the vehicle sent a response to the trigger message. If no response is received from the OBU associated with the vehicle, then the verification method 500 may issue a citation and/or alert toll enforcement personnel at step 508. If a response is received from the OBU associated with the vehicle, then the verification method 500 may extract information from the response at step 510. The response from the OBU associated with the vehicle may include the location of the OBU at the approximate time the trigger message was received. If the trigger message included a time-stamp, then the response from the OBU associated with the vehicle may include the location of the OBU at the approximate time of the time-stamp. The response may also include other information, such as vehicle information and time and date information. The response from the OBU associated with the vehicle may be sent over a cellular communication network, such as, for example a GSM network. The response may be, for example, a SMS message, a wireless data message (e.g., GPRS, UMTS, LTE, WIFI, etc.), or any other suitable message. At step 512, an OBU/vehicle database may be updated to indicate vehicles that are associated with the OBUs that responded to the trigger.

Information about the vehicle such as, for example, the vehicle license plate number, may be obtained at step 514. At step 516, the verification method 500 may determine if the vehicle has an associated OBU by comparing the vehicle information obtained in step 514 to the updated information in the OBU/vehicle database. If the vehicle does not have an associated OBU, then the verification method 500 may issue a citation to the registered owner of the license plate and/or alert toll enforcement personnel at step 508. If the vehicle has an associated OBU, then the OBU may pay an applicable toll at step 518. The applicable toll may be paid immediately upon calculation by the OBU, or may be paid at a later time. The verification method 500 ends at step 520.

According to the foregoing, various exemplary embodiments provide for a system and method for verifying if a vehicle is equipped with a functional OBU.

It should be apparent from the foregoing description that various exemplary embodiments of the invention may be implemented in hardware and/or firmware. Furthermore, various exemplary embodiments may be implemented as instructions stored on a tangible and non-transitory machine-readable storage medium, which may be read and executed by at least one processor to perform the operations described in detail herein. A tangible and non-transitory machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A verification system for verifying whether a vehicle is equipped with a functional on-board unit (OBU), *the verification system* comprising:

[a license plate recognition system] *a memory* configured to [obtain] *store* a license plate number of the vehicle*; the license plate number obtained by a license plate recognition system* at a first location;

a database of license plate numbers and OBU information, wherein the database includes a correspondence of license plate numbers and OBU information;

a wireless communication system *operably connected to a wireless communication network, wherein the wireless communication system is* configured to send a trigger message *over the wireless communication network* to the OBU using the OBU information *corresponding to the license plate number to trigger the OBU to send a response*, and configured to receive [a] *the* response *over the wireless communication network* from the OBU indicating a location of the OBU; and

[a verification module] *a processor operably connected to the wireless communication system to receive the OBU response from the wireless communication system and* configured to determine whether the vehicle is equipped with the OBU, wherein the [verification module] *processor* determines that the vehicle is equipped with the OBU if the location reported by the OBU is within a specified distance of the first location.

2. The verification system of claim 1, wherein the trigger message is sent wirelessly, and wherein the response from the OBU is received wirelessly.

3. The verification system of claim 1, wherein the trigger message is at least one of a SMS message, a cellular data message, a WIFI message, and a cellular telephone call.

4. The verification system of claim 1, wherein the response from the OBU is at least one of a SMS message, a WIFI message, and a cellular data message.

5. The verification system of claim 1, wherein the verification system issues a citation to the owner of the license plate if the location reported by the OBU is not within a specified distance of the first location.

6. The verification system of claim 1, wherein the verification system issues a citation to the owner of the license plate if the license plate number obtained by the license plate recognition system does not have corresponding OBU information in the database.

7. The verification system of claim 1, wherein the verification system receives a toll payment from the OBU based upon a measured location of the vehicle.

8. A method for verifying whether a vehicle is equipped with a functional on-board unit (OBU), comprising:

[obtaining] *receiving from a license plate recognition system,* a license plate number of the vehicle*; the license plate number obtained by a license plate recognition system* at a first location;

obtaining OBU information that corresponds to the license plate number;

sending a trigger message to the OBU using the OBU information;

receiving a response from the OBU indicating a location of the OBU; and determining that the vehicle is equipped with the OBU if the location reported by the OBU is within a specified distance of the first location.

9. The method of claim 8, wherein the trigger message is sent wirelessly, and wherein the response from the OBU is received wirelessly.

10. The method of claim 8, wherein the trigger message is at least one of a SMS message, a cellular data message, a WIFI message, and a cellular telephone call.

11. The method of claim 8, wherein the response from the OBU is at least one of a SMS message, a WIFI message, and a cellular data message.

12. The method of claim 8, further comprising:

issuing a citation to the registered owner of the license plate if the location reported by the OBU is not within a specified distance of the first location.

13. The method of claim 8, further comprising:

issuing a citation to the registered owner of the license plate if the OBU information cannot be obtained from the license plate number.

14. The method of claim 8, further comprising:

receiving a toll payment from the OBU based upon a measured location of the vehicle.

15. A method for verifying whether a vehicle is equipped with a functional on-board unit (OBU), comprising:

triggering the OBU to transmit a location of the OBU;

updating a database with the location of the OBU, wherein the database includes a correspondence of license plate numbers and OBU information;

[obtaining] *receiving from a license plate recognition system,* a license plate number of the vehicle*; the license plate number obtained by a license plate recognition system* at a first location;

obtaining the location of the OBU from the database by using the correspondence of license plate numbers and OBU information; and determining that the vehicle is equipped with the OBU if the location reported by the OBU is within a specified distance of the first location.

16. The method of claim 15, wherein the OBU is triggered when the OBU connects to a new cellular base station.

17. The method of claim 15, wherein the OBU is triggered by at least one of a SMS message, a cellular data message, a WIFI message, and a cellular telephone call.

18. The method of claim 15, wherein the OBU transmits the location of the OBU wirelessly.

19. The method of claim 15, wherein the OBU transmits the location of the OBU as at least one of a SMS message, a WIFI message, and a cellular data message.

20. The method of claim 15, further comprising:

issuing a citation to the registered owner of the license plate if the location reported by the OBU is not within a specified distance of the first location.

* * * * *